United States Patent [19]

Whyte

[11] 4,394,877
[45] Jul. 26, 1983

[54] WASTE FLUID RECEPTACLE

[76] Inventor: Lance Whyte, 5307 Queensberry Ave., Springfield, Va. 22151

[21] Appl. No.: 290,525

[22] Filed: Aug. 6, 1981

[51] Int. Cl.³ .............................................. B65B 3/04
[52] U.S. Cl. ..................................... 141/98; 141/231; 141/266; 141/275; 141/373; 184/1.5; 224/273
[58] Field of Search ................. 141/98, 231, 232, 233, 141/373, 367, 368, 369-372, 374-381, 250-284; 224/42.23, 275; 206/216, 223; 220/1 C; 414/508; 184/1.5

[56] References Cited

U.S. PATENT DOCUMENTS

| 2,821,312 | 1/1958 | Wiegel | 414/508 |
| 3,163,880 | 1/1965 | Johnson | 414/508 |
| 3,329,290 | 7/1967 | Lowery | 414/508 |
| 3,523,404 | 8/1970 | Girardi | 414/508 |
| 3,667,573 | 6/1972 | Edwards | 184/1.5 |
| 3,810,487 | 5/1974 | Cable et al. | 184/1.5 |
| 4,274,645 | 6/1981 | Ferguson et al. | 184/1.5 |

FOREIGN PATENT DOCUMENTS

| 662953 | 11/1938 | Fed. Rep. of Germany | 184/1.5 |
| 354108 | 8/1931 | United Kingdom | 184/1.5 |

Primary Examiner—Houston S. Bell, Jr.
Attorney, Agent, or Firm—Dennison, Meserole, Pollack & Scheiner

[57] ABSTRACT

A waste fluid receptacle for receiving engine oil, transmission fluids, coolants, hydraulic fluids, and other service fluids normally employed in motor vehicles, is mounted on a support secured beneath a service vehicle and is movable between retracted and extended positions. In the extended mode, the receptacle may be positioned beneath an engine or engine accessory sump on a vehicle or other piece of equipment to be serviced and in such position, may receive fluids drained therefrom during periodic service. An appropriate reservoir may be selectively coupled to said receptacle to receive for subsequent disposal the waste fluids collected initially in the receptacle.

13 Claims, 10 Drawing Figures

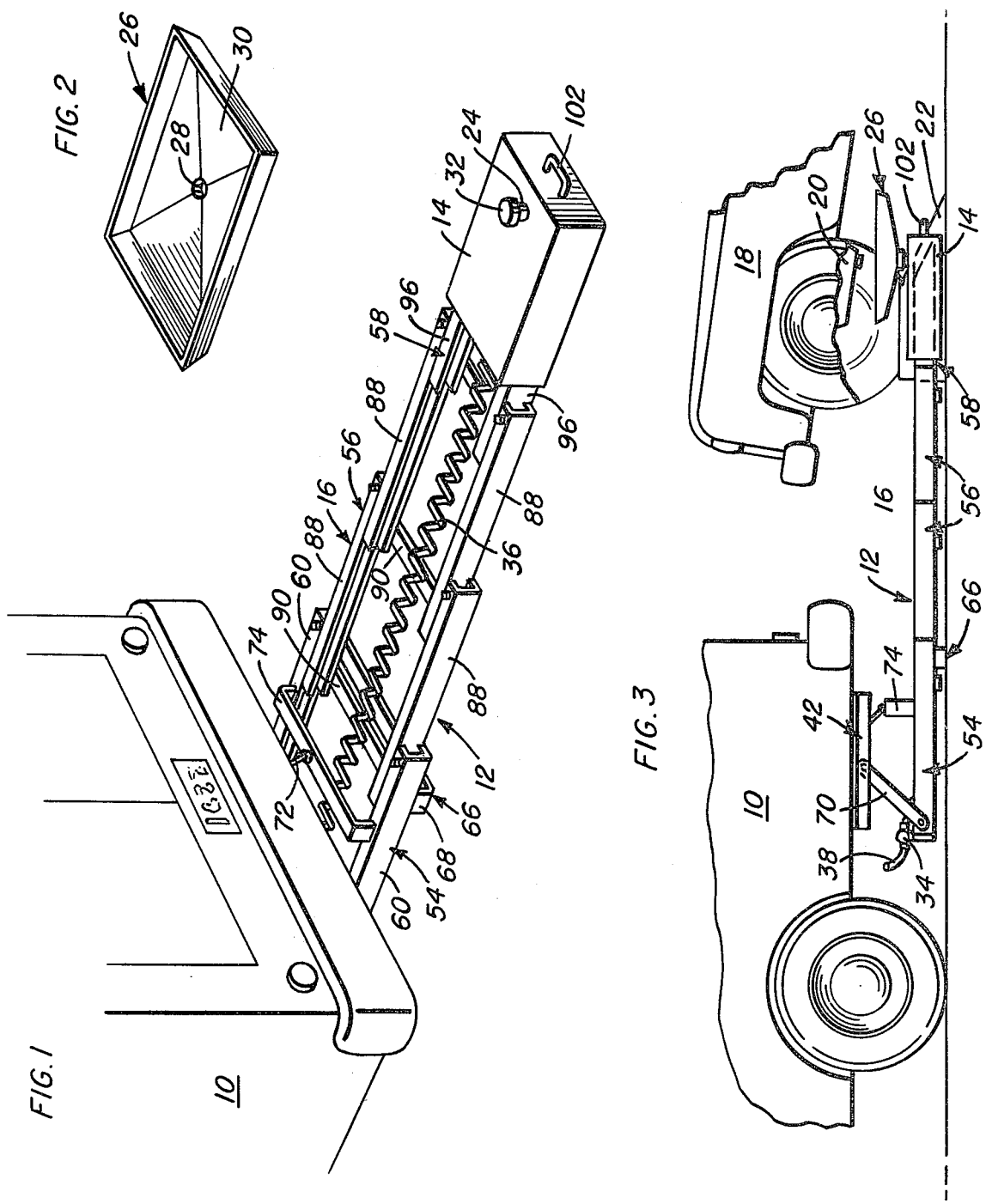

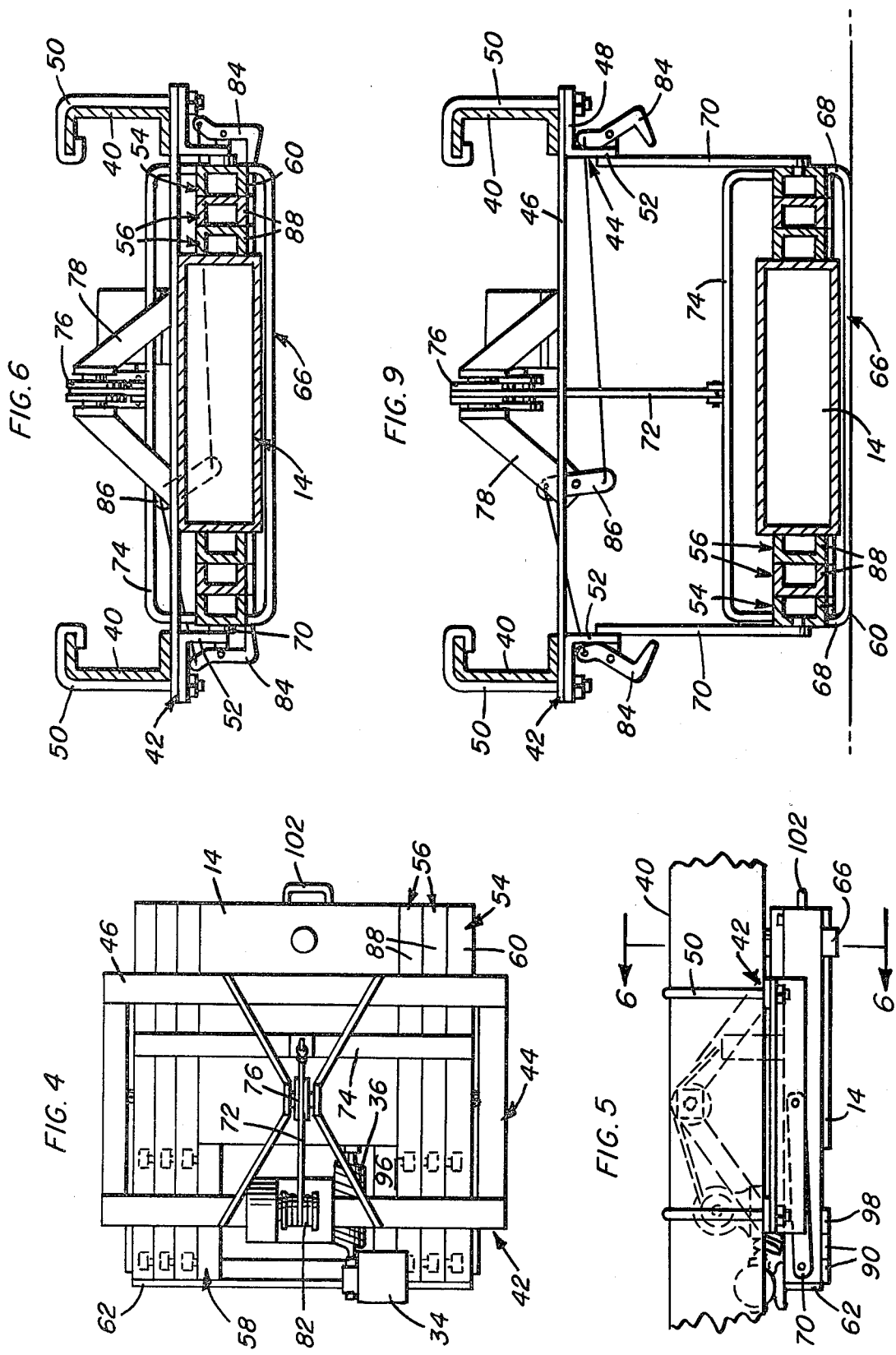

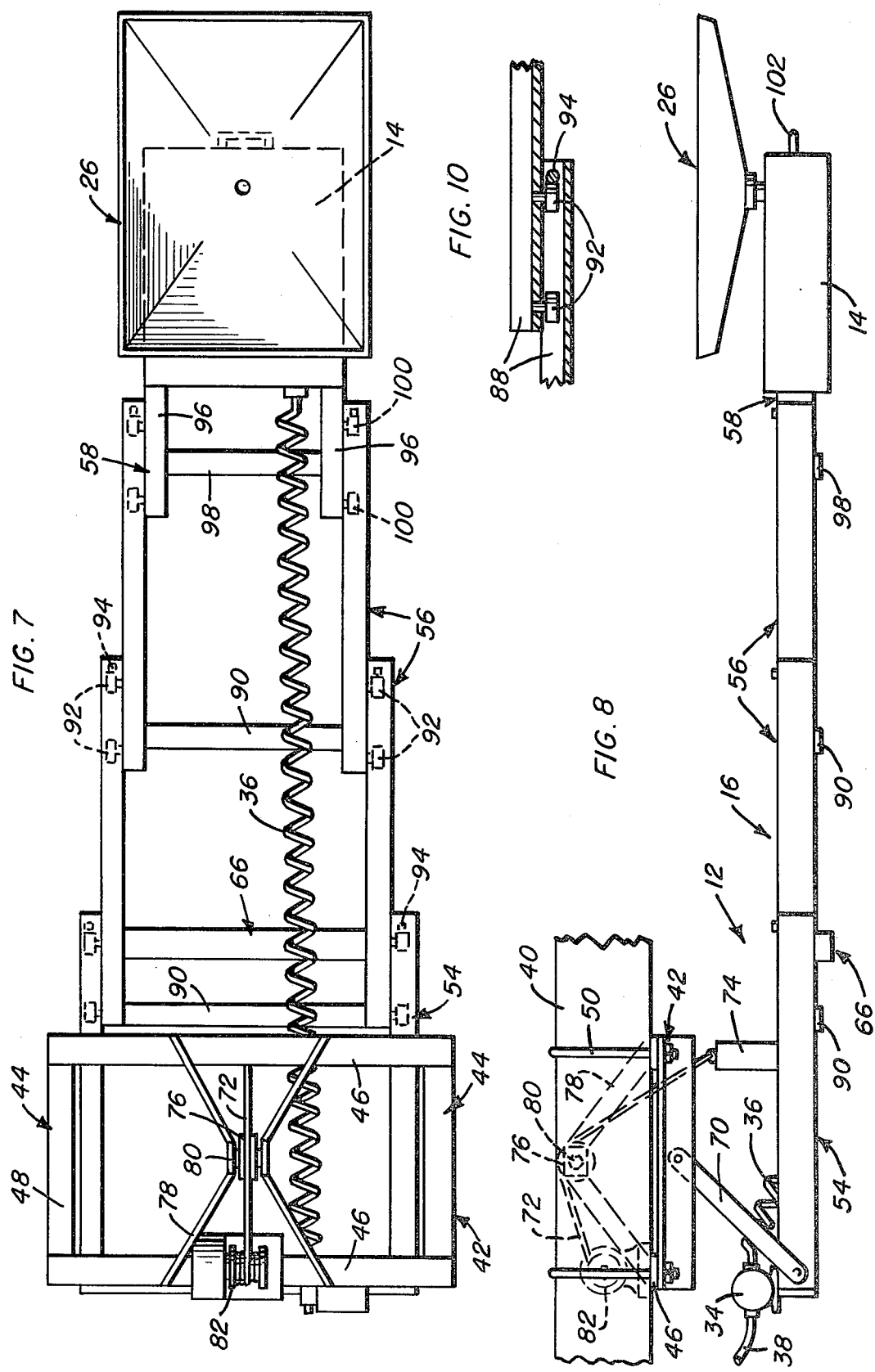

WASTE FLUID RECEPTACLE

BACKGROUND OF THE INVENTION

This invention relates to the servicing of various forms of motorized equipment which employ internal combustion engines requiring periodic replacement of various fluids employed in the operation of the equipment. Engine oils, coolant fluids, transmission and differential fluids, as well as hydraulic fluids, must be periodically drained from such equipment and replaced with fresh supplies.

In the past, most automotive service stations were equipped and staffed to provide their customers with appropriate facilities to drain and replace engine oils and other attendant fluids normally employed in automated vehicles. With the advent of the "self-service" type gasoline station, many such establishments no longer provide periodic maintenance service for their customers. Thus, the customer is required to seek out what may be an inconvenient location to have the service performed or, in the alternative, he must perform the service himself. If the latter action is chosen, it requires that the operator of the vehicle be equipped with appropriate tools and facilities to perform the service himself which may have obvious attendant problems.

In addition to the individual motor vehicle operator, there are significant numbers of fleet vehicle operators both in connection with passenger vehicles, such as rental organizations, taxi fleets, governmental and company operated motor pools, as well as industrial vehicles, such as buses, trucks, cranes, tractors, air compressors, aircraft, off-the-road vehicles, and the like. Each of these pieces of equipment must periodically receive preventive maintenance service which involves the necessity of withdrawing and replacing various oils, coolants, fuels and other fluids normally involved in the operation of the equipment.

My invention provides a means whereby individual vehicles may be serviced at a convenient location without the necessity of bringing the individual unit to a service facility. Thus, my invention contemplates taking the service facility directly to the vehicle or equipment to be serviced and by appropriate manipulation of the service vehicle and the extensible waste fluid receptacle attached thereto, the service technician may drain the fluids into the receptacle conveniently and without the necessity of inconveniencing the owner or operator of the vehicle to be serviced.

Moreover, my invention avoids the necessity of having the owner-operator of the vehicle become involved in the potentially messy activities associated with draining oil from the engine, coolants from radiators, hydraulic fluids, etc., and insures that these waste fluids will not be indiscriminately discarded. A single workman employing a service vehicle equipped with my waste fluid receptacle can within a short time service a fleet of vehicles without the necessity of moving any of these vehicles, thus effecting a significant reduction in operator cost and periodic maintenance of the vehicles. By utilizing my invention, vehicles can be serviced during non-use hours, thus avoiding any interference with the productive times of employment of such equipment. This is particularly significant with respect to industrial equipment, bus fleets, and aircraft.

In the past, various attempts have been made to facilitate the draining of waste fluids from motor vehicles, but insofar as I am aware, there has been no attempt to provide a service vehicle mounted extensible fluid receiving system, such as is proposed by my invention. Examples of the prior art of which I am aware are represented by the following patents:

U.S. Pat. No. 1,555,326—Mummert
U.S. Pat. No. 1,568,830—Gunderson
U.S. Pat. No. 1,880,546—Wanamaker
U.S. Pat. No. 2,376,874—Henry
U.S. Pat. No. 2,385,393—Wilson All of the foregoing patents represent floor supported receptacles which are normally attendant to a conventional service station operation and none suggest the vehicular arrangement which I propose herein.

SUMMARY OF THE INVENTION

My invention contemplates mounting an extensible support on or beneath a service vehicle which may be positioned adjacent a vehicle to be serviced. A receptacle to receive fluids drained from the subject vehicle or other appropriate equipment is mounted on the extensible support and is positioned by manipulation of the support and the service vehicle beneath the appropriate sump or reservoir from which the fluids are to be drained. The sump plug is removed and the fluids drained into the receptacle and the appropriate completion of the task is effected by replacing the sump plugs and replenishing the supply of fluid previously drained with fresh supplies.

The extensible support may then be retracted and the contents of the waste fluid receptacle transferred to a larger reservoir by means of an appropriate pump, or the like, for subsequent judicious disposal.

The invention further contemplates the support rack as including appropriate supporting hardware attached to the frame, or the like, of the service vehicle in such a manner that normal over-the-road operations of the service vehicle are not inhibited thereby and in such a manner that a single operator can with facility and relative ease effect the periodic maintenance on the vehicles to be serviced without assistance and without the necessity of moving the subject vehicles during the operation. In some instances, if surface clearances are marginal, it may be necessary to elevate the vehicle to be serviced by the use of appropriate jacks or ramps in order to provide sufficient clearance to gain access to the various drain sump plugs, etc.

While I have disclosed my invention in the accompanying drawings as including a telescoping parallel track arrangement with the waste fluid receptacle mounted at the outer extremity, it should be recognized that it is considered that such structure is for illustrative purposes only and that it is within the scope of my invention that the waste receptacle could be mounted on a single extensible fluid pressure cylinder or mechanically operated jack screw, as well as any other extensible supporting arrangement which would permit the operator to position the waste fluid receptacle in the desired location beneath the vehicle or equipment being serviced.

It is therefore an object of my invention to facilitate the servicing of various forms of internal combustion engines and engine components associated with motor vehicles, as well as other construction equipment, and to safely and effectively remove therefrom waste fluids for appropriate subsequent disposal.

It is a further object of my invention to furnish on site vehicular service and to eliminate the need to transport the equipment to be serviced to a particular and perhaps inconvenient location.

These and other objects will become apparent from a consideration of the accompanying drawings and the attendant description thereof which follows in which like numerals are used to designate like parts thoughout the several views.

BRIEF DESCRIPTION OF THE DRAWINGS

FIG. 1 is a perspective view of a fragmentary portion of a service vehicle with the fluid drain assembly of my invention attached thereto and illustrated in the extended position.

FIG. 2 is a perspective view of an accessory drain pan utilized with my invention.

FIG. 3 is a fragmentary side elevation of my invention in extended position with the drain receptacle positioned beneath a vehicle being serviced.

FIG. 4 is a plan view of my invention in retracted position.

FIG. 5 is a side elevation view of my invention in its retracted position and attached to a fragmentary section of a vehicle frame.

FIG. 6 is a cross-sectional view taken along the lines 6—6 of FIG. 5.

FIG. 7 is a top view of my invention with its several components in extended condition.

FIG. 8 is a side elevational view of the device illustrated in FIG. 7 with a fragmentary view of a supporting vehicle rail illustrated.

FIG. 9 is a sectional view similar to FIG. 6 with the fluid drain assembly lowered for movement into operative position.

FIG. 10 is a fragmentary top view partly in section of one form of the telescoping support structure.

PREFERRED EMBODIMENTS OF THE INVENTION

Considering now more specifically the drawings, as illustrated in FIG. 1, a service motor vehicle 10, shown in fragmentary form, is equipped with the fluid drain assembly 12 of the invention. This assembly basically comprises a waste fluid receptacle 14 carried by a multiple part extensible and retractable track system generally illustrated at 16. The track system to be described in more detail hereinafter is mounted beneath the service vehicle and may be moved between the extended position illustrated in FIGS. 1, 3, 7 and 8, or the retracted position illustrated in FIG. 4.

The degree of extension of the track system 16, and hence the location of the fluid receptacle 14, is governed by the relative positions of the service vehicle 10 and the vehicle or equipment from which the fluid is to be drained. For purposes of illustration, FIG. 3 positions the drain receptacle beneath the oil pan of an automobile or similar vehicle 18. In use, the service vehicle 10 is maneuvered to generally align the fluid drain assembly 12 with the vehicle 18 to be serviced in a manner whereby lowering and extension of the fluid drain assembly 12 relative to the service vehicle 10 will bring the fluid receptacle 12 in direct underlying relation to the source of draining fluid, this, in the illustrated example, being the drain port of the vehicle oil pan 20. If necessary, in order to accommodate the drain fluid receptacle 14 beneath the serviced vehicle 18, the appropriate portion of the vehicle 18 can be elevated in any conventional manner, such as by jacks, or, as illustrated, by inclined ramps 22.

In order to facilitate drainage of the fluid into the receptacle 14, and avoid the necessity of aligning the drain port from the vehicle 18 with the inlet port 24 of the receptacle 14, an enlarged drain pan 26 will normally be provided. This drain pan will incorporate a central drain aperture 28 provided with a depending collar which is either received about or received within the vertically projecting neck portion of the receptacle port 24 for direct drainage of the pan received fluid into the receptacle 14. This drainage is encouraged by a sloping of the floor 30 of the pan 26 toward the drainage aperture 28. An appropriate cap 32 will be provided on the upper end of the neck of the port 24 for sealing of the receptacle when not directly receiving drainage fluid.

It is contemplated that the receptacle be capable of storing approximately twenty gallons, thus enabling the servicing of several conventional automobiles, or the like, without the necessity of emptying the receptacle 14. However, it is also contemplated that the capacity of the fluid drain assembly be substantially greater than that of the receptacle 14 itself. This is accomplished by providing for periodic, or even continuous emptying of receptacle 14 with the drainage fluid being transferred to a substantially larger reservoir (not shown), preferably located within the service vehicle 10 itself, by means of a pump 34 connected with the reservoir through a fluid carrying coiled hose 36 capable of contracting and elongating in conjunction with the shifting of the position of the receptacle 14. A similar hose 38 will communicate the discharge port of the pump 34 with the storage reservoir.

As previously referred to, the entire fluid drain assembly 12 mounts on, is initially positioned by, is manipulated relative to, and is controlled from the service vehicle 10. This is effected, in the illustrated embodiment, by mounting the assembly 12 on the frame of the service vehicle, and in particular, on the frame side rails 40, with the assembly 12 underlying the rear portion of the vehicle 10 for relative rearward extension therefrom. While illustrated in this particular position, it is to be appreciated that the assembly 12 can mount in substantially any appropriate manner beneath the vehicle for extension, as an example, from the side or front thereof as might be dictated by circumstances.

With continued reference to the illustrated embodiment, a mounting frame 42 is provided. This frame 42 basically comprises a pair of longitudinally extending angle bars 44 positioned in a laterally spaced parallel relation to each other and interconnected by transversely extending spaced flat bars 46 overlying and welded, or otherwise affixed, to the horizontally extending upper flanges 48 of the angle bars 44. The angle bars 44 underlie the frame rails 40 and are rigidly clamped thereto by a plurality of frame-engaging hook bolts 50, or the like. The angle bars 44 also include depending flanges 52 to which the track system 16 is mounted.

The track system 16 comprises a series of telescoping track sections including a frame mounted inner section 54, a plurality of intermediate sections 56, and a receptacle mounting outer section 58.

The frame-mounted track system inner section 54 includes a pair of laterally spaced, inwardly facing channel rails 60 interconnected, at the aligned inner ends thereof, by a transverse flat bar 62 which can act as an abutment for the nested or telescoped sections of the track as shall subsequently become apparent. The forward portions of the channel bars 16 are interconnected by a transverse bar 66 positioned in spaced relation below the inner track section 54 and having upturned end portions 68 welded to the lower surfaces of the track bars 60. As will be appreciated from FIGS. 3 and 9, this transverse bar, in addition to stabilizing the forward portion of the track section 54, also acts as a support for the assembly in the lowered position thereof.

The track section 54, and hence the entire drain assembly 12, mounts on the support frame 42, for vertical movement relative thereto, by one or more pairs of rigid links or linking arms 70, each having the opposed ends thereof respectively pivoted to the depending flange 52 of the overlying frame angle bar 44 and the vertical outer face of the channel bar 60 generally aligned therebelow. The actual raising and lowering of the assembly is effected by a winch controlled cable 72 having an outer end fixed centrally to a rigid yoke 74 spanning the inner track section 54 in spaced relation thereabove and with the opposed end portions downwardly turned for rigid securement with the track section side rails 60. The cable 72 extends over an appropriate idler pulley 76 positioned centrally over the mounting frame 42 by suitable framework defined by upwardly angled support legs 78 which support a pulley received transverse shaft 80. The inner end portion of the cable 72 is wound on and controlled by means of an appropriate winch 82 which may be either motor controlled, as illustrated, or manually controlled. Constructed in this manner, and as will be particularly apparent from FIGS. 5, 6, 8 and 9, selective extension and retraction of the cable 72 will result in a corresponding vertical shifting of the assembly between an upper or retracted stored position and a lowered operative position.

As a safety measure, a pair of opposed latches 84 are pivotally mounted to the depending angle bar flanges 52 for selective movement between a first position engaged beneath the channel bars 60 of the elevated inner track section 54, as illustrated in FIG. 6, and an outwardly pivoted disengaged position, as illustrated in FIG. 9, to allow for a free vertical travel of the track section. These latches, either mechanically or manually controlled, will normally be simultaneously manipulated by a link connection with a central rotating plate 86 pivotally secured to the mounting frame 42 at some appropriate central point thereon.

Referring now to the intermediate track sections 56, each is formed of a pair of laterally spaced, inwardly facing channel bars or rails 88, the spacing of the channel rails of each of the sections 56 being such so as to position these rails parallel to and immediately inward of the rails of the section immediately rearward thereof, rather this be the rearmost section 54, or one of the intermediate sections 56. A flat stabilizing interconnecting member or bar 90 underlies the rails 88 of each of the track sections 56 and is rigidly affixed thereto. The transverse bar 90 of the rearmost of the intermediate sections 56 is positioned at, or approximately at, the extreme rear end portions of the rails 88. The next forward intermediate section 56 has the transverse flat bar 90 forwardly positioned, relative to the rear ends of the corresponding rails 88, a distance equal to or slightly greater than the width of the previously referred to rail 90 whereby upon telescopic collapsing of the sections into each other, noting FIGS. 4 and 5 in particular, all of these sections will retract into substantially completely nested relationship with each other with the rear ends thereof generally engaged against the rearmost vertical abutment plate 62. In this position, the progressive forward positioning of the stabilizing cross bars 90 are easily accommodated.

The actual interengagement of the intermediate track sections 56, both with each other and with the rearmost track section 54, is effected by means of two sets of rollers or wheels 92 mounted on each track section 56. Each set of wheels includes a transversely aligned pair of wheels, one mounted on the vertical back flange of each of the channel rails 88 and projecting laterally therefrom for confined traveling engagement within the adjacent inwardly facing channel rail of the track section immediately rearward thereof. As will be appreciated from FIG. 7 in particular, a first pair of the wheels 92 is located immediately adjacent the rear of the particular section with the associated second pair of wheels positioned in spaced relation forward thereof. The set of wheels, or the two pairs of wheels which define the set of wheels of each track section, provide for a cantilevered support of the track sections. In order to limit forward travel of each of the sections relative to the section immediately to the rear thereof, appropriate stop pins 94, as detailed in FIG. 10, can be provided between the upper and lower channel bar flanges of the particular channel rails within which the wheels travel.

The forwardmost track section 58 is, similar to the intermediate sections, constructed of a pair of laterally spaced inwardly opening parallel channel bars or rails 96 having a transverse flat stabilizing bar 98, which aligns with the bars 90, and two spaced pairs of mounting and guiding rollers 100 received within the channel rails of the intermediate section 56 immediately therebehind. The drain receptacle 14 is of equal width with the forward track section 58, and mounts on the forward ends of the section rails 96 in forwardly projecting relation thereto. Noting FIG. 4 in particular, the combined length of the forwardmost track section 58 and receptacle 14 mounted thereon is equal to the length of the remaining sections 54 and 56 for a compact telescopic collapsing of the assembly 12.

As illustrated, the fluid drain assembly 12 is manually extendible and retractable. Accordingly, and as a means for facilitating the selective positioning of the assembly 12, an appropriate handle 102 is affixed centrally to and projects forwardly from the front end of the receptacle 14.

If considered necessary to support the extended end of the assembly 12, particularly with the receptacle partially full, appropriate support wheels or skids can be mounted on the forward track section 58 or the receptacle 14 itself. Such means should be mounted inboard of the outer faces of the outermost track section rails 96 to avoid interference with the telescopic action of the assembly.

While the assembly, as illustrated, is manually extendible and retractable, it is to be appreciated that any appropriate power means, such as a hydraulic ram, a rack and pinion system, or the like, can be utilized for motorized control of the longitudinal position of the assembly. Further, other means can be substituted for the illustrated telescopically collapsible and extendible track system. For example, the waste receptacle could be mounted on a single extensible hydraulic cylinder unit, or, alternatively, on a mechanically operated jack screw, or the like.

From the foregoing, it will be appreciated that a unique apparatus, for changing of vehicle or equipment fluids, has been set forth. This apparatus mounts directly on and is manipulated relative to a service vehicle which transports the apparatus directly to the equipment to be serviced, positions the apparatus relative to the equipment, supports the apparatus during the actual draining of the fluid from the equipment, and provides for removal of the waste fluid.

Structurally, the apparatus includes a waste fluid receiving receptacle, normally having a fluid and gathering drain pan mounted thereover, an extensible support system for the waste receptacle, a mounting frame for securing the support system to the service vehicle, and positioning means for selectively moving the retracted assembly between a vertically elevated stored position wherein the assembly is secured by appropriate latches, and a downwardly shifted position from which the assembly can be extended into operative position beneath a vehicle or other equipment being serviced.

The foregoing is considered illustrative of the principles of the invention. Other embodiments and modifications may occur to those skilled in the art, and as such, it is not desired to limit the invention to the exact construction and operation shown and described. Rather, all suitable modifications and equivalents may be resorted to falling within the scope of the invention as claimed.

I claim:

1. A waste fluid drain assembly mountable on and selectively manipulated for extension and retraction relative to a service vehicle for selective alignment beneath a fluid reservoir in a vehicle to be serviced, said assembly comprising a waste fluid receptacle, vehicle engagable support means for mounting said assembly on a service vehicle in underlying depending relationship therefrom, and selectively extensible and retractable positioning means engaged between said fluid receptacle and said support means for selectively adjusting the position of the receptacle relative to the support means between a stored position beneath an assembly mounting service vehicle and an extended portion wherein the receptacle is located remote from the service vehicle in alignment beneath a fluid reservoir of a vehicle to be serviced, whereby waste fluid can be drained from a fluid reservoir and into said receptacle.

2. The fluid drain assembly of claim 1 wherein said positioning means includes means for vertically adjusting the position of said receptacle relative to said support means, and means for horizontally adjusting the position of said receptacle relative to said support means.

3. The fluid drain assembly of claim 2 wherein the means for horizontally adjusting the position of said receptacle comprises multiple interengaged telescopically extensible and retractable sections.

4. The fluid drain assembly of claim 3 wherein said sections are manually extensible and retractable.

5. The fluid drain assembly of claim 4 wherein each of said sections includes a pair of laterally spaced rails parallel to and longitudinally shiftable relative to each adjacent rail of each adjacent section.

6. The fluid drain assembly of claim 5 wherein said sections include an inner section, an outer section, and at least one intermediate section, said means for vertically adjusting the position of said receptacle engaging between said support means and said inner section for support and vertical adjustment of said inner section, said receptacle being mounted on said outer section.

7. The fluid drain assembly of claim 6 wherein the means for vertically adjusting the position of the receptacle comprises rigid link means pivotally engaged between said support means and the inner section, and selectively extensible and retractable cable means depending from said support means and engaged with said inner section.

8. The fluid drain assembly of claim 7 including means for selectively draining fluid from said receptacle, said means for draining fluid comprising discharge pump means and a fluid line engaged between said receptacle and said pump means.

9. The fluid drain assembly of claim 3 wherein said means for vertically adjusting the position of the receptacle comprises rigid link means pivotally engaged between said support means and one of said sections, and selectively extensible and retractable cable means depending from said support means and engaged with said one of said sections.

10. The fluid drain assembly of claim 1 including means for selectively draining fluid from said receptacle, said means for draining fluid comprising discharge pump means and a fluid line engaged between said receptacle and said pump means.

11. A fluid drain system in combination with a service vehicle for draining waste fluid from a fluid reservoir in a vehicle to be serviced comprising a waste fluid receptacle, said service vehicle, support means mounting said receptacle on said service vehicle in underlying dependent relationship therefrom, and selectively extensible and retractable positioning means engaged between said support means and said receptacle for selectively adjusting the position of the receptacle relative to the sevice vehicle between a stored position beneath the service vehicle and an extended position wherein the receptacle is located remote from the service vehicle and beneath and in alignment with a fluid reservoir of the vehicle to be serviced, whereby waste fluid can be drained from a fluid reservoir of a vehicle to be serviced and into said receptacle.

12. The fluid drainage system of claim 11 wherein said service vehicle includes a frame, said support means engaging said frame, said positioning means depending from said support means below the service vehicle frame for retraction of the receptacle into a frame underlying position.

13. The fluid drainage system of claim 1 wherein said positioning means, when extended, is of a length wherein said receptacle is positioned laterally outward of said service vehicle.

* * * * *